Sept. 8, 1953

P. C. ZACCARDO ET AL

PHONOGRAPH RECORD CABINET WITH RECORD SELECTING MECHANISM 2,651,556

Filed June 9, 1949

2 Sheets-Sheet 1

INVENTORS:
Pascal C. Zaccardo and
Dominick Iannone
BY
Samuel J. Steel
ATTORNEY

Pascal C. Zaccardo and
Dominick Iannone
INVENTORS

BY
Samuel J. Stoll
ATTORNEY

Patented Sept. 8, 1953

2,651,556

UNITED STATES PATENT OFFICE 2,651,556

PHONOGRAPH RECORD CABINET WITH RECORD SELECTING MECHANISM

Pascal C. Zaccardo and Dominick Iannone, Rosedale, N. Y.

Application June 9, 1949, Serial No. 97,981

2 Claims. (Cl. 312—15)

This invention relates to a phonograph record cabinet having a record selecting mechanism.

Phonograph record cabinets having selecting mechanisms have heretofore been designed and patented. In all cases, however, they have had inherent defects and disadvantages which rendered them unsuitable for the purposes for which they were constructed. In virtually every case they have failed to provide means for adequately supporting the records with consequent injury or damage thereto. More specifically, they have provided horizontal supporting means for supporting the edges of the records which are disposed vertically relative to said horizontal supporting means, but they have utterly failed to provide means for supporting the sides of the records. This has resulted in warping and buckling of the records, especially on warmer days and in steam-heated surroundings, such as city apartments, with consequent sound reproduction distortions. These earlier cabinets, in most cases, have also been found to be unsatisfactory in that guiding and spacing means have not been provided between adjacent records. As a result the forward or backward movement of any one record relative to its two adjoining records has caused scratches and other abrasions to appear in the sides of the records and this too has clearly had an unfortunate effect upon the playing or reproducing properties and qualities of the records. Furthermore, the earlier devices have almost invariably been complicated and intricate in construction and the cost of their production has placed them beyond the reach of many users of phonograph records who would otherwise be desirous of purchasing them.

It is accordingly the principal object of this invention to provide a phonograph record cabinet of the character described which overcomes the several disadvantages of earlier phonograph record cabinets as above described and which affords advantages of its own. More particularly, the phonograph record cabinet comprising the present invention is provided with a plurality of individual record holders, that is, one holder for each record. These record holders not only support the records at their bottom edges but they also support them at their sides. The records are therefore prevented from warping or buckling and they are prevented from causing injury to each other when they are taken out of the cabinet or replaced therein. Moreover, the operating mechanism of the present invention is exceedingly simple both in construction and in operation. The present construction is well adapted for manufacture on a mass production basis, each of its parts being simple to make and easy to reproduce in quantity.

Another important object of the present invention is the provision of a phonograph record cabinet of the character described which includes specific facilities for the accommodation of records of varying sizes. In the preferred form of this invention, there are two tiers of record holders, one of the tiers of holders being adapted to accommodate ten inch records and the other tier of holders being adapted to accommodate twelve inch records. None of the phonograph record cabinets of the prior art, to applicant's knowledge, provides facilities for receiving records of different sizes. In all cases known to applicant the earlier cabinets are each provided with only a single tier of record holders wherein all of the holders are of identical size.

Another object of the present invention is the provision of a phonograph record cabinet of the character described wherein the individual record holders are adapted to remain in their advanced positions, after having been brought forward by the record selecting mechanism, until such time as they are manually returned to their original storing positions. It is therefore possible to select a plurality of records at the same time although they are usable, of course, only one at a time. In many of the record cabinets of the prior art, if not all of them, the records may be selected only one at a time since they automatically return to their original positions the moment they are released by the selecting mechanism. It is necessary therefore, in these earlier phonograph record cabinets, to actuate the selecting mechanism each time a record is to be withdrawn therefrom, since there is no way of retaining a plurality of selected records in their advanced or selected positions.

There are oher objects and advantages of the present invention which will become apparent from a reading of the specification. It should be understood at the outset that the phonograph record cabinet shown in the drawing and described in the specification constitutes merely one preferred form of the present invention and that other forms thereof as well as modifications of the present form are all contemplated within the broad scope and coverage of the invention. For example, the drawing is based upon a handmade model which was constructed almost entirely of wood. It was found necessary, therefore, to make the parts in ways that are far removed from mass production practices and it should clearly be understood therefore, that the invention is not to be considered as being limited solely to the parts shown in the drawing. Metal stampings and molded plastic parts are certainly to be preferred over hand-fashioned wooden parts even though these wooden parts may be found in the drawing hereto appended.

A preferred form of this invention is shown in the accompanying drawing in which.

Figure 4:
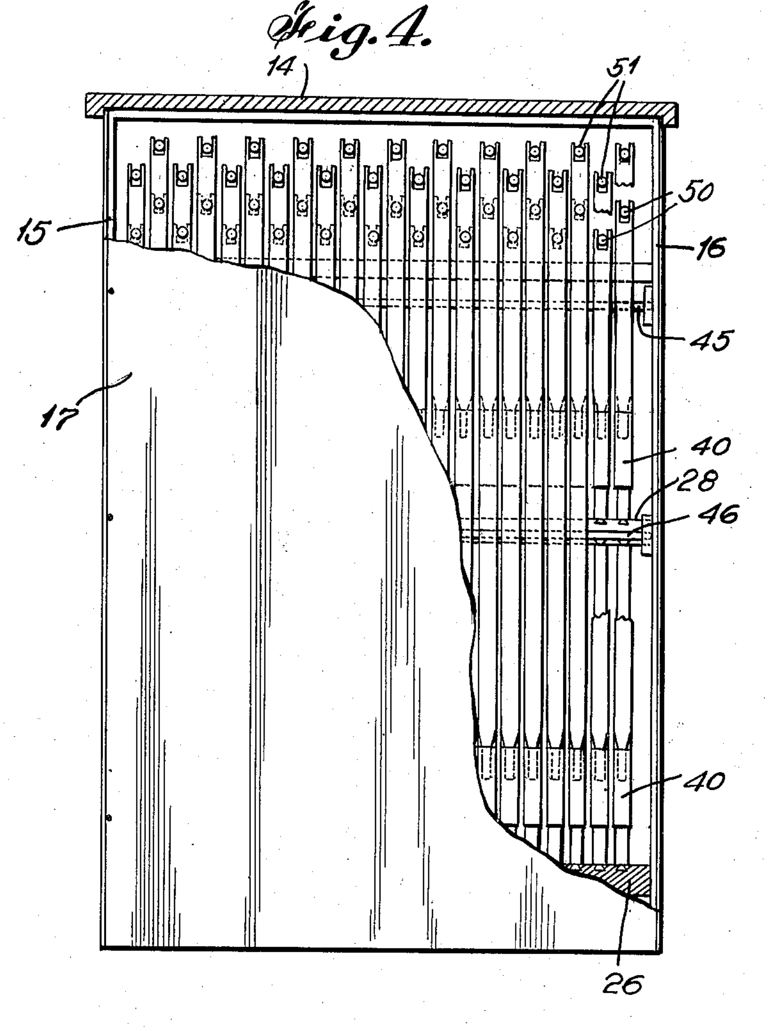
Figure 5:
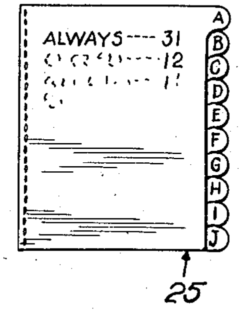

Fig. 4 is a back view of said cabinet wherein the back wall is partly broken away to expose the record selecting mechanism as well as the record holders; and Fig. 5 is a view of an index book such as may be used in connection with the record selecting mechanism of the phonograph record cabinet, said index book being provided for the purpose of cataloguing the records contained in the record cabinet and of properly identifying them with respect to the pushbuttons which actuate the record selecting mechanism of the phonograph record cabinet.

Figures 1, 2, 3:
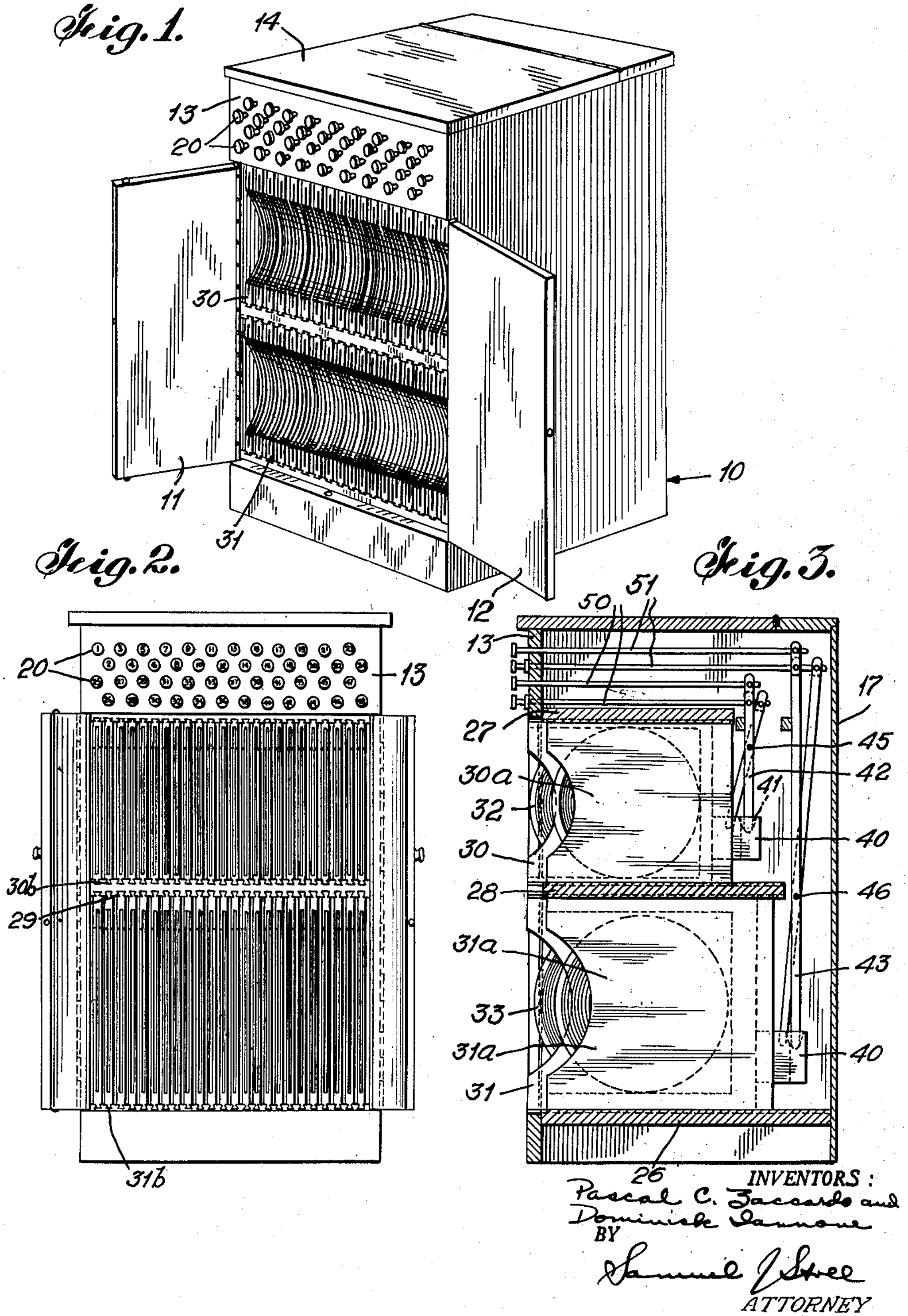
Fig. 1 is a perspective view of a phonograph record cabinet made in accordance with the present invention, showing the doors of the cabinet in open position to expose the record holders therein contained.
Fig. 2 is a front view of said record cabinet, the doors being also shown in open position.
Fig. 3 is a sectional view wherein the plane of the section extends vertically of the cabinet from front to rear thereof, showing the record selecting mechanism and showing some record holders in advanced or selected position and other record holders in retracted or storing position.

As Fig. 1 clearly shows the phonograph record cabinet 10 made in accordance with the present invention has a pair of doors 11 and 12 respectively, a panel board 13 above said doors and a hingedly mounted cover board 14 above and behind said front panel board. The two side boards 15 and 16 are fixedly connected to the structural frame of the cabinet but back board 17 may be detachably secured thereto. The two front doors provide a front closure for the record holders and they must be opened before records can be removed therefrom. Hinged cover 14 may be raised or swung to open position to expose the record selecting mechanism and the back board 17 may also be removed for the same purpose. The front panel board 13 has a plurality of pushbuttons 20 mounted thereon for selective actuation of the record selecting mechanism. Each pushbutton has a number or other identifying character or legend marked thereon which is keyed to a corresponding number, character or legend listed in index book 25. In the preferred arrangement, each pushbutton has a number marked thereon which corresponds to the name of a song or other sound recording listed alphabetically in index book 25. For example, the song named "Always" is listed under the letter A in index book 25 and opposite the name of said song in said book is the number or reference character 31. Reference to Fig. 2 will disclose the fact that one of the pushbuttons 20 is marked 31 and when this pushbutton is actuated, the selecting mechanism operates to move a certain record holder forward so that the record therein may be removed for playing or other purposes. It will be understood, of course, that one of the songs recorded on said record is the song named "Always."

The record holding and selecting means are best shown in Fig. 3. It will there be seen (and also in Fig. 2) that the cabinet includes three horizontally extending shelves: a bottom shelf 26, a top shelf 27 and an intermediate shelf 28. These shelves are provided with dovetail-shaped grooves 29, that is, shelf 27 has such grooves formed on its lower or bottom side, shelf 26 has them formed on its upper or top side and shelf 28 has them formed both on the top and on the bottom. These grooves are in registration with each other, that is the grooves of top shelf 27 are in registration with the grooves on the top side of shelf 28 and the grooves of bottom shelf 26 are in registration with grooves formed in the bottom side of said shelf 28.

These grooves 29 serve as tracks for record holders 30 and 31 respectively. It will be noted that record holders 30 are somewhat smaller than record holders 31 and it will be understood that the smaller record holders are adapted to accommodate ten inch records 32 whereas the larger record holders are adapted to accommodate twelve inch records 33. Each record holder 30 has two side walls 30*a* and dovetail-shaped top and bottom edges 30*b*. Each record holder 31 has two side walls 31*a* and also dovetail-shaped top and bottom edges 31*b*. Record holders 30 and 31 are closed at the top and bottom, at the back, and also at the two sides. They are open only at the front which is cut out to expose the records. It will be understood from the foregoing that the dovetail-shaped edges of the record holders are in slidable engagement with the dovetail-shaped grooves of the cabinet shelves. It is therefore possible to slide the record holders either forwardly into record selecting position or backwardly into record storing position. The record holders are individually movable and there is no inter-relationship or interaction between adjacent or non-adjacent record holders. When the record holders are moved either to forward position or to backward retracted position, they remain in such position until they are moved manually or mechanically to the other positions. It is thus possible to select a plurality of records at the same time by moving their respective record holders to forward position and the record holders will remain in such position as long as desired so that the selected records may be removed therefrom and replaced therein seriatim.

The means whereby these record holders may selectively be moved from one position to another is clearly shown in Figs. 3 and 4. It will be seen that each record holder has an extension piece 40 formed thereon or attached thereto along its back edge. Each extension piece 40 has a hole or pocket 41 formed therein to accommodate an actuating lever. In the case of record holders 30 the actuating levers are the relatively short levers 42 shown in Fig. 3 and in the case of record holders 31 the actuating levers are the relatively long levers 43 shown in said figure. All of short levers 42 are pivotally mounted on a common horizontally extending rod 45 and all of the longer levers are pivotally mounted on another common rod 46 which is also horizontally disposed. The lower end of each lever projects into the pocket 41 of the extension piece 40 of a single, given record holder. A flexible connection is thereby provided between the lower end of each lever and its corresponding extension piece 40, said connection being partly pivotal and partly slidable. The top end of each lever 42 is pivotally connected to a horizontally extending rod 50 which projects through a hole in panel board 13 and which has affixed to its outwardly projecting end a pushbutton 20. Each lever 43 is also pivotally connected at its upper end to a horizontally connected rod 51 and said rod too extends through a hole in the front panel board and has a pushbutton 20 affixed thereto at its outwardly projecting end.

The operation of the record selecting mechanism is clear from the foregoing description of its construction. When it is desired to select a given record, the appropriate pushbutton 20 is pushed inwardly, toward and against front panel board 13. Since said pushbutton is attached to the end of one of the horizontally extending rods above mentioned, said rod will move backwardly with said pushbutton, integrally therewith, and it will actuate the lever to which it is attached. More specifically, the upper end of the lever will be caused to move backwardly and the lower end of the lever will be caused to move forwardly. Since the lower end of the lever is connected to the extension piece of one of the record holders, said forward movement of the lower end of said lever will produce a corresponding forward movement of said record holder and the record contained in said holder will thereby be moved forwardly to accessible position so that it may be removed from its said record holder. When it is desired to move the record holder back to its original position, it may simply be pushed back manually or it may be pulled back by pulling upon the pushbutton and bringing said pushbutton back to its original forward position.

It will be understood from the foregoing that the several parts of the phonograph record cabinet and its record selecting mechanism are shown in the drawing solely for illustrative purposes. These parts may be changed or modified in many ways and corresponding parts may be substituted for them, all within the broad scope and coverage of the present invention.

We claim:

1. A phonograph record cabinet having a record holding and selecting mechanism, comprising a cabinet, top, bottom and intermediate shelves mounted in said cabinet, a plurality of forwardly and backwardly extending tracks formed on the top of the bottom shelf, on the bottom of the top shelf, and both on the top and bottom of the intermediate shelf, a plurality of record holders mounted on said shelves for slidable movement forwardly and backwardly along said tracks, a plurality of levers individually connected to said record holders, a plurality of lever-actuating members individually connected to said levers, whereby said levers may be actuated individually to move the record holders from forward position to backward position and from backward position to forward position along their respective tracks, and means for pushing the records forwardly when the record holders are moved forwardly, said means comprising rear walls on the record holders which engage the peripheral edges of the records and push the records forwardly simultaneously with the forward movement of said record holders, said record holders being also provided with side walls which support the sides of the records and with cutouts in said side walls which expose portions of the records when they are stored in said record holders.

2. A phonograph record cabinet having a record holding and selecting mechanism, comprising a cabinet, a plurality of shelves mounted in said cabinet, a plurality of forwardly and backwardly extending tracks formed on said shelves, a pluralty of record holders mounted on said shelves for slidable movement forwardly and backwardly along said tracks, there being two tiers of record holders mounted on separate shelves, the record holders of one of said tiers being of a size to accommodate disc-shaped records of relatively small diameter and the record holders of the other tier being of a size to accommodate disc-shaped records of relatively large diameter, a plurality of levers individually connected to said record holders, a plurality of lever-actuating members individually connected to said levers whereby said levers may be actuated individually to move the record holders from forward position to backward position and from backward position to forward position along their respective tracks, and means for pushing the records forwardly when the record holders are moved forwardly, said means comprising rear walls on the record holders which engage the peripheral edges of the records and push the records forwardly simultaneously with the forward movement of said record holders, said record holders being also provided with side walls which support the sides of the records and with cutouts in said side walls which expose portions of the records when they are stored in said record holders.

PASCAL C. ZACCARDO.
DOMINICK IANNONE.

References Cited in the file of this patent

UNITED STATES PATENTS

| Number | Name | Date |
|---|---|---|
| 841,405 | Jewell | Jan. 15, 1907 |
| 924,002 | Schmidt | June 8, 1909 |
| 1,449,922 | Tresnak | Mar. 27, 1923 |
| 1,569,207 | Sears | Jan. 12, 1926 |
| 2,381,517 | Price | Aug. 7, 1945 |
| 2,402,076 | Painter | June 11, 1946 |